United States Patent
Noda et al.

(10) Patent No.: US 7,846,303 B2
(45) Date of Patent: Dec. 7, 2010

(54) MULTI-STRUCTURE INTERNAL HEAT EXCHANGE TYPE DISTILLATION TOWER

(75) Inventors: Hideo Noda, Amagasaki (JP); Hiroshi Yamaji, Amagasaki (JP); Nobuyuki Kuratani, Amagasaki (JP); Kunio Kataoka, Amagasaki (JP)

(73) Assignee: Kansai Chemical Engineering Co., Ltd., Hyogo (JP)

( * ) Notice: Subject to any disclaimer, the term of this patent is extended or adjusted under 35 U.S.C. 154(b) by 918 days.

(21) Appl. No.: 11/660,444

(22) PCT Filed: Aug. 15, 2005

(86) PCT No.: PCT/JP2005/015175
§ 371 (c)(1),
(2), (4) Date: Feb. 16, 2007

(87) PCT Pub. No.: WO2006/022208
PCT Pub. Date: Mar. 2, 2006

(65) Prior Publication Data
US 2007/0251679 A1 Nov. 1, 2007

(30) Foreign Application Priority Data
Aug. 24, 2004 (JP) ............................. 2004-243745

(51) Int. Cl.
*B01D 3/26* (2006.01)
*F28D 7/00* (2006.01)
(52) U.S. Cl. ...................... 202/155; 165/144; 165/155; 202/158; 202/172
(58) Field of Classification Search ............... 165/144, 165/145, 155; 202/155, 158, 172, 187, 237
See application file for complete search history.

(56) References Cited

U.S. PATENT DOCUMENTS 2,117,337 A * 5/1938 Lobl et al. ................. 159/27.1

(Continued)

FOREIGN PATENT DOCUMENTS

JP          1-179704         12/1989

(Continued)

*Primary Examiner*—Virginia Manoharan
(74) *Attorney, Agent, or Firm*—Vedder Price P.C.; Ajay A. Jagtiani (57) ABSTRACT

The present invention provides a multi-structured internal heat exchange-type distillation column including at least an outermost heat exchange section, an intermediate section, and an innermost heat exchange section, in which the innermost heat exchange section is isolated from the intermediate section, the outermost heat exchange section is also isolated from the intermediate section, the outermost heat exchange section and the innermost heat exchange section are in communication with one another through at least two vapor tunnel connecting ports, a channel is formed inside the outermost heat exchange section in such a manner that, in a case where at least one of the vapor tunnel connecting ports serves as an inlet for vapor from the innermost heat exchange section into the outermost heat exchange section, and the other vapor tunnel connecting port serves as an outlet for vapor from the outermost heat exchange section back to the innermost heat exchange section, the vapor can smoothly flow in one-way traffic from the inlet toward the outlet, and either the outermost heat exchange section and the innermost heat exchange section, or the intermediate section, is a rectifying section, and the other is a stripping section. The distillation column of the present invention has excellent efficiency of internal heat exchange.

2 Claims, 6 Drawing Sheets

U.S. PATENT DOCUMENTS

| | | | |
|---|---|---|---|
| 3,844,898 A * | 10/1974 | De Graff | 202/154 |
| 4,308,107 A * | 12/1981 | Markfort | 203/23 |
| 4,644,934 A * | 2/1987 | Kaus | 126/640 |
| 5,675,054 A * | 10/1997 | Manley et al. | 585/809 |
| 5,783,047 A * | 7/1998 | Aso et al. | 202/154 |
| 2003/0000213 A1 * | 1/2003 | Christensen et al. | 60/670 |
| 2007/0102276 A1 * | 5/2007 | Lubman et al. | 202/160 |

FOREIGN PATENT DOCUMENTS

| | | |
|---|---|---|
| JP | 2-95501 | 7/1990 |
| JP | 5-220301 A | 8/1993 |
| JP | 8-131704 A | 5/1996 |
| JP | 2001-137606 A | 5/2001 |
| WO | WO 2004/002602 | 1/2004 |

* cited by examiner

MULTI-STRUCTURE INTERNAL HEAT EXCHANGE TYPE DISTILLATION TOWER

CROSS-REFERENCE TO RELATED APPLICATIONS

This application is a national stage application of PCT/JP2005/015175, entitled "Multi-Structure Internal Heat Exchange Type Distillation Tower," filed on Aug. 15, 2005, which claims the priority of Japanese Patent Application No. 2004-243745 entitled "Cell surface layer-binding protein and utilization thereof," filed on Aug. 24, 2004. The entire contents and disclosure of which are hereby incorporated by reference.

TECHNICAL FIELD

The present invention relates to a multi-structured internal heat exchange-type distillation column.

BACKGROUND ART

Distillation processes are very widely performed in many fields including the petrochemical industry. Multi-stage distillation columns are used in order to perform fractional distillation more precisely. When a usual distillation process is performed using multi-stage distillation columns, there may arise the problem that energy consumption is very large. Accordingly, internal heat exchange-type distillation columns have been proposed in order to utilize the energy efficiently. For example, Japanese Laid-Open Patent Publication No. 8-131704 discloses an internal heat exchange-type distillation column having a structure in which a single tube is inserted in the central section of a cylindrical main body, which forms a concentric double-tube structured column having a rectifying section inside the single tube and a stripping section outside thereof. With this concentric double-tube structured internal heat exchange-type distillation column, the single tube, i.e. the inner tube is divided into a plurality of blocks and forms a multi-stage structure in which a plurality of blocks are stacked in the vertical direction. The rectifying section of one block is linked to the rectifying section of an adjacent block by a connecting tube, and the heat of the rectifying section is transferred to the stripping section via the wall of the single tube and the wall of the connecting tube.

WO 2004/002602 describes an internal heat exchange-type distillation column with good efficiency of heat transfer, whose trays can be washed easily and for which maintenance involving periodic inspections can be easily performed. The distillation column design is such that the stripping section and the rectifying section can be opened and closed, and the distillation column is provided with heat transfer means projecting into the stripping section from the surface of the rectifying section that is in contact with the stripping section, and the heat of the rectifying section is transferred through the heat transfer means. The efficiency of heat transfer of this distillation device is higher than that of the device disclosed in Japanese Laid-Open Patent Publication No. 8-131704. However, the efficiency of heat transfer still remains to be improved.

DISCLOSURE OF THE INVENTION

The present invention provides an internal heat exchange-type distillation column with even better utilization ratio of energy (efficiency of heat transfer).

The present invention provides a multi-structured internal heat exchange-type distillation column comprising at least an outermost heat exchange section, an intermediate section, and an innermost heat exchange section; wherein the innermost heat exchange section is isolated from the intermediate section; wherein the outermost heat exchange section is also isolated from the intermediate section; wherein the outermost heat exchange section and the innermost heat exchange section are in communication with one another through at least two vapor tunnel connecting ports; wherein a channel is formed inside the outermost heat exchange section in such a manner that, in a case where at least one of the vapor tunnel connecting ports serves as an inlet for vapor from the innermost heat exchange section into the outermost heat exchange section, and the other vapor tunnel connecting port serves as an outlet for vapor from the outermost heat exchange section back to the innermost heat exchange section, the vapor can smoothly flow in one-way traffic from the inlet toward the outlet; and wherein either the outermost heat exchange section and the innermost heat exchange section, or the intermediate section, is a rectifying section, and the other is a stripping section.

In a preferable embodiment, the outermost heat exchange section is made up of a plurality of outermost heat exchange chambers that are arranged independent of one another and horizontal direction; wherein each of the plurality of outermost heat exchange chambers is in communication with the innermost heat exchange section through at least two vapor tunnel connecting ports; and wherein the channel is formed inside each of the plurality of outermost heat exchange chambers.

In a preferable embodiment, the outermost heat exchange section and the innermost heat exchange section are the rectifying section, and the intermediate section is the stripping section.

In a more preferable embodiment, the multi-structured internal heat exchange type distillation column has a multiple cylinder structure, a coiled tube structure, or a plate structure.

In a more preferable embodiment, the innermost heat exchange section and the intermediate section are filled with packings.

In a more preferable embodiment, the innermost heat exchange section and the intermediate section are installed with trays.

In a more preferable embodiment, the innermost heat exchange section is installed with trays and the intermediate section is filled with packings.

In a more preferable embodiment, the innermost heat exchange section is filled with packings and the intermediate section is installed with trays.

In the multi-structured internal heat exchange-type distillation column of the present invention, the outermost heat exchange section and the innermost heat exchange section are in communication with one another and thus the internal heat transfer is carried out from both the inner and outer surfaces of the intermediate section. Further, the one-way traffic flow of vapor from the inlet to the outlet in the channel formed inside the outermost heat exchange section can make the vapor flow smoothly toward the outlet without any stagnant zone. Thus, by setting either the outermost and the innermost heat exchange sections or the intermediate section, as the high pressure side (high temperature side), and the other as the low pressure side (low temperature side), it is possible to provide an internal heat exchange type distillation column in which energy consumption is greatly reduced with very high efficiency of heat transfer.

BEST MODE FOR CARRYING OUT THE INVENTION

The multi-structured internal heat exchange-type distillation column of the present invention has a multilayered structure that is made up of at least an outermost heat exchange section, an intermediate section, and an innermost heat exchange section. The innermost heat exchange section and the outermost heat exchange section are isolated from the intermediate section, respectively. The innermost heat exchange section and the outermost heat exchange section are in communication with one another through at least two vapor tunnel connecting ports. The channel formed inside the outermost heat exchange section is designed such that if at least one of the vapor tunnel connecting ports serves as the inlet for vapor from the innermost heat exchange section into the outermost heat exchange section, and the other vapor tunnel connecting port serves as the outlet for vapor from the outermost heat exchange section back to the innermost heat exchange section, then the vapor can flow smoothly in one-way traffic from the inlet toward the outlet. Also, either the outermost and the innermost heat exchange sections or the intermediate section, is the rectifying section, and the other is the stripping section.

Figure 1:
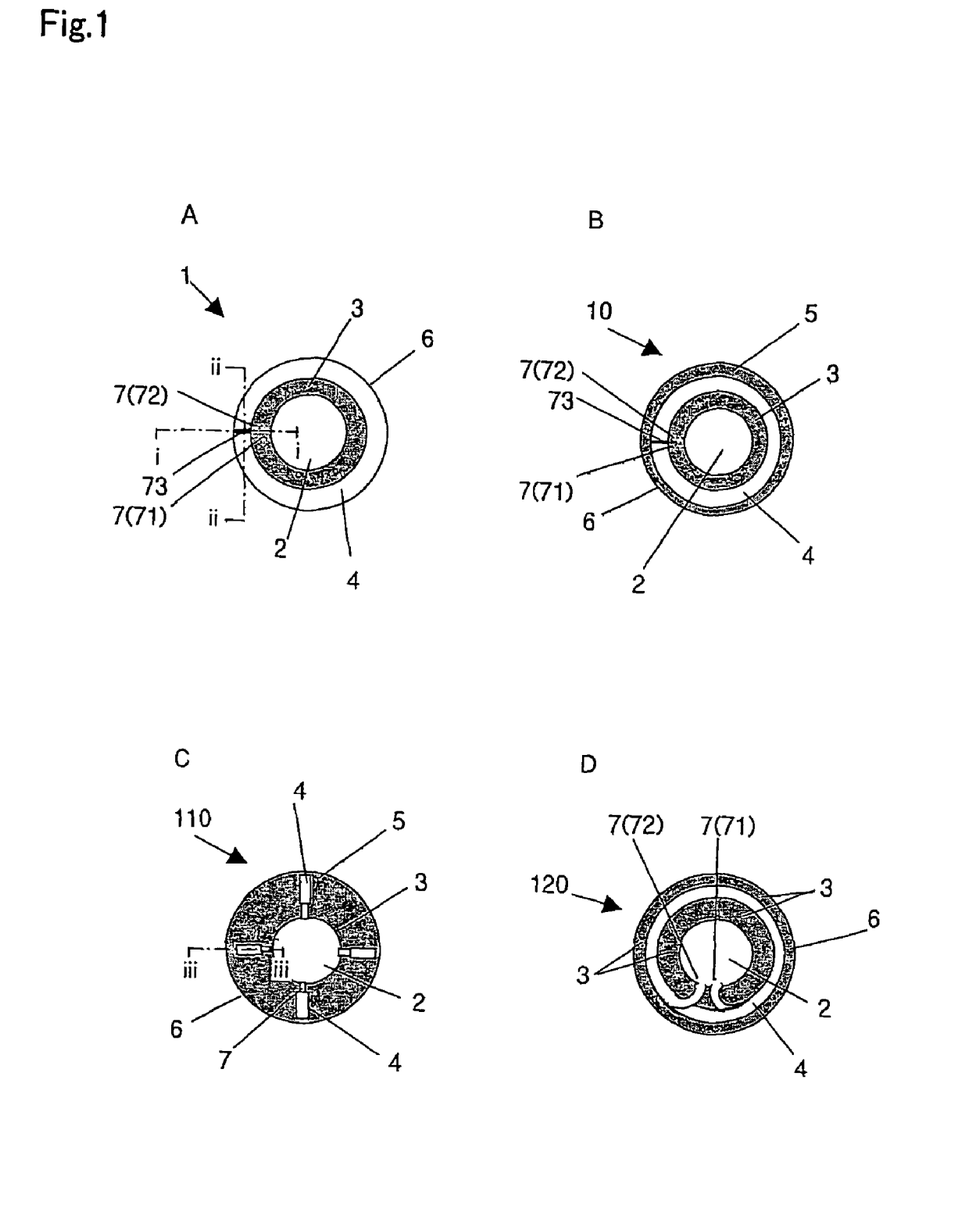
FIG. 1 is a top cross-sectional schematic view of the multi-cylinder internal heat exchange type distillation column of the present invention.

The multi-structured distillation column of the present invention can have a multi-cylinder structure or a plate structure, and these will be described with reference to the drawings. FIG. 1A is a top cross-sectional view of an internal heat exchange-type distillation column 1 having a triple cylinder structure, which is one embodiment of the present invention. The triple cylinder structure internal heat exchange-type distillation column 1 is made up of an innermost heat exchange section 2, an intermediate section 3, an outermost heat exchange section 4, and an outer casing 6. The innermost heat exchange section 2 and the intermediate section 3 are isolated from one another, and the intermediate section 3 and the outermost heat exchange section 4 are isolated from one another. The innermost heat exchange section 2 and the outermost heat exchange section 4 are in communication with one another via at least two vapor tunnel connecting ports 7.

FIG. 1B is a top cross-sectional view of an internal heat exchange-type distillation column 10 having a quadruple cylinder structure, which is another embodiment of the present invention. The distillation column 10 has one more outermost section 5 between the outermost heat exchange section 4 and the outer casing 6 in addition to the structure of the internal heat exchange type distillation column 1 having the triple cylinder structure of FIG. 1A. The outermost section 5 is isolated from the outermost heat exchange section 4. Additionally, it is also possible to adopt a further layered structure by providing sites such as a second intermediate section and a second heat exchange section between the intermediate section 3 and the outermost heat exchange section 4 shown in FIG. 1A and FIG. 1B.

FIG. 1C is a top cross-sectional view of an internal heat exchange type distillation column 110 that has a plate structure, which is another embodiment of the present invention. The outermost heat exchange section 4 of the distillation column 110 having a plate structure is placed within the intermediate section 3. The innermost heat exchange section 2 and the outermost heat exchange section 4 are in communication with one another through at least two vapor tunnel connecting ports 7. As shown in FIG. 1C, the plate structure is arranged radially. The direction of the plate structure to be installed and the number of plates, etc., can be determined based on the operation conditions.

FIG. 1D is a top cross-sectional view of an internal heat exchange type distillation column that has a coiled tube structure, which is another embodiment of the present invention. The outermost heat exchange section 4 of the distillation column 120 has a coiled tube structure and is arranged within the intermediate section 3. The innermost heat exchange section 2 and the outermost heat exchange section 4 are linked via at least two vapor tunnel connecting ports 7. As shown in FIG. 1D, the coiled tube structure is place on a circle that is concentric with the innermost heat exchange section 2. The direction of the coiled tube to be installed and its length, for example, can be determined based on the operation conditions.

A channel is formed inside the outermost heat exchange section 4 of FIGS. 1A to 1D so that vapor can flow only in one-way traffic from the inlet toward the outlet. If the innermost heat exchange section 2 and the outermost heat exchange section 4 are used as the rectifying section, the channel should be designed such that vapor is introduced into the outermost heat exchange section 4 from at least one of the vapor tunnel connecting sections 7 that serve as vapor inlets, and the vapor passes through the channel provided inside the outermost heat exchange section 4 and is then returned to the innermost heat exchange section 2 from another vapor tunnel connecting section 7 that serves as the vapor outlet.

As described above, it is sufficient to have at least two vapor tunnel connecting ports 7. The vapor tunnel connecting ports 7 can be positioned near one another or away from one another, but it is preferable that they are positioned away from one another. In either case, the channel for vapor inside the outermost heat exchange section 4 is configured such that the vapor is smoothly flowing in one-way traffic without any stagnant zone. In other words, the vapor entering from a vapor inlet 71 flows only in one-way direction toward a vapor outlet 72. A specific example of the channel of the outermost heat exchange section 4 of the multi-structured distillation column is described. The channel of the outermost heat exchange section 4 having the structure of FIG. 1A is formed in an annular shape due to a baffle plate in intimate contact with the inner wall and outer wall, and is partitioned by a partitioning plate 73. Vapor entering from the bottommost section flows circumferentially until arriving at the partitioning plate 73, then turns upward and flows circumferentially in the direction opposite to its original direction in the next baffle plate, and returns to the inlet-side partitioning plate 73. The vapor that has returned turns upward again and flows circumferentially in the next baffle plate and its direction of the successive flows is inverted by the partitioning plate 73 on the other side. After repeating this, the vapor ultimately flows out from the vapor outlet 72. This channel formed spirally allows the vapor flow to become smooth.

FIGS. 2A to 2C are partial cross-sectional views schematically showing the channel formed in this way. FIG. 2A and FIG. 2B are cross-sectional views taken along the line i-i and the line ii-ii in FIG. 1A in a case where the vapor tunnel connecting ports 7 are arranged near one another. In the outermost heat exchange section 4 of FIG. 2A, vapor entering from the vapor inlet 71 flows until colliding against the partitioning plate 73, then turns upward and flows backward along the immediately above channel until colliding against the partitioning plate 73 again and moves to the next channel. FIG. 2B is a diagram showing how the vapor arriving at the partitioning plate 73 turns upward and flows into the channel one above. Then, as shown in FIG. 2A and FIG. 2B, the vapor ultimately comes down from the highest channel toward the vapor outlet 72 and returns to the innermost heat exchange section 2.

FIG. 2C is a cross-sectional view taken along the line ii-ii in FIG. 1A in a case where the vapor tunnel connecting ports 7 are placed away from one another. FIG. 2C differs from FIGS. 2A and 2B in that the vapor flows out from a vapor outlet 72 positioned at the top of the outermost heat exchange section 4, but the vapor flow is the same as in the case of FIG. 2A and FIG. 2B.

FIG. 2D is a cross-sectional view taken along the line iii-iii of the multi-structured distillation column having the plate structure of FIG. 1C, and schematically shows the channel inside the outermost heat exchange section 4. The channel is formed inside the plate-shaped box by baffle plates. This channel is formed in such a manner that vapor can flow in only a single direction.

FIG. 2E is a schematic view showing the vapor channel in a case where a coiled tube structure is used as the outermost heat exchange section 4. In FIG. 2E, a tray 21 located between the vapor inlet 71 and the vapor outlet 72 causes a pressure drop, and owing to the pressure difference generated between those vapor inlet and outlet the vapor entering from the vapor inlet 71 flows in one-way traffic upward along the coiled tube and flows out from the vapor outlet 72.

As shown in FIGS. 2A to 2E, the vapor channel of the outermost heat exchange section 4 should have a configuration that allows vapor entering from the vapor inlet 71 to flow in one-way traffic toward the vapor outlet 72. When distillation is performed, the vapor mixture containing of at least two components (substances) with different boiling points is flowing inside the distillation column. If such a channel were not provided in the outermost heat exchange section 4, the vapor flow would stop owing to a stagnant zone formed by the more-volatile component, thereby the less-volatile component condenses and liquefies to flow down along the inner wall whereas the vapor of more-volatile component is stagnant so that effective internal heat exchange does not occur. However, in the present invention, the vapor entering the outermost heat exchange section 4 flows smoothly along the channels with effective internal heat exchange and flows out from the outlet.

In the present invention, there is no particular limitation regarding the shape of the channel. For example, it is possible that the channel is formed spirally by using a baffle plate or a pipe with a semi-circular cross-section. Such a spiral channel arrangement allows the vapor to flow smoothly along the inner wall of the outermost heat exchange section 4.

In the above configuration, by adopting a setting in which one of either the outermost heat exchange section 4 and the innermost heat exchange section 2, or the intermediate section 3 (and the outermost section 5), serves as the rectifying section, and the other serves as the stripping section, the column can be used as a multi-structured internal heat exchange type distillation column. In a case where the outermost section 5 and the intermediate section 3 of the quadruple cylinder-structured internal heat exchange distillation column 10 of FIG. 1B serve as the rectifying section, then it is preferable that the outermost section 5 and the intermediate section 3 are in communication with one another.

In this multi-structured internal heat exchange type distillation column, the rectifying section is pressurized to set it to a higher temperature than the temperature of the stripping section. At this time, the net amount of heat, which is obtained by subtracting the amount of heat calculated from the work required for the pressurization from the amount of heat that has been transported from the rectifying section to the stripping section, indicates the amount of the energy savings. By providing the outermost heat exchange section 4, the intermediate section 3 (stripping section) is sandwiched by the innermost heat exchange section 2 and the outermost heat exchange section 4 and is heated from both sides. Since a sufficiently large heat transfer area may be secured, the amount of work used for the pressurization may be considerably smaller than the internal heat exchange rate, and this increases the energy saving effect.

It is preferable that the outermost heat exchange section 4 is made up of a plurality of outermost heat exchange chambers 4a that are provided independent of one another and are arranged vertically. Each of the plurality of outermost heat exchange chambers 4a is in communication with the innermost heat exchange section 2 through at least two vapor tunnel connecting ports 7. FIG. 3 is a schematic cross-sectional view showing the structure of the outermost heat exchange chambers 4a. In FIG. 3, the vapor tunnel connecting ports 7 are provided at two locations, in an upper part and a lower part of each outermost heat exchange chamber 4a, as the vapor inlet 71 (vapor tunnel connecting port 71) and the vapor outlet 72 (vapor tunnel connecting port 72). In the outermost heat exchange chambers 4a, a unidirectional channel through which the vapor of the innermost heat exchange section 2 enters the outermost heat exchange chamber 4a through the vapor tunnel connecting port 71 and returns to the innermost heat exchange section 2 through the vapor tunnel connecting port 72. FIG. 3 represents a cross-sectional view taken along the line i-i in a case where the outermost heat exchange section 4 of FIG. 1A has been divided into a plurality of outermost heat exchange chambers 4a. The channel in FIG. 3, like in FIG. 1A, formed in an annular shape due to a baffle plate is arranged in intimate contact with the inner wall and the outer wall, and is partitioned by a partitioning plate 73. As described above with FIG. 2, vapor enters from the vapor inlet 71 (lower vapor tunnel connecting port) and flows forward circumferentially from the vapor inlet 71 up to the partitioning plate 73. The vapor colliding against the partitioning plate 73 turns upward and flows backward circumferentially in the channel immediately above, and moves into the next channel after colliding against the partitioning plate 73. As this process is repeated, ultimately vapor leaves the channel from the vapor outlet 72 for the innermost heat exchange section 2. As mentioned above, instead of a baffle plate, it is also possible to suitably install a pipe with a semi-circular cross-section or a coil, for example, so that the vapor moves spirally along the inner wall of the outermost heat exchange section 4.

If the outermost heat exchange section 4 were only a single chamber (if it had not been partitioned), then the condensed liquid would return to the bottom of the main rectifying section. Thus, since there is no reflux effect to the various sections, this may bring an insufficient effect of reflux on the target or specifications of distillation. In this case, if a certain sufficient reflux to the top of the column of the condensing section can be achieved, then distillation is possible, but it is necessary to withdraw energy outside the overhead condenser to return the condensate liquid as the external reflux. In contrast, the outermost heat exchange section 4 partitioned into a plurality of outermost heat exchange chambers 4a allows the vapor introduced into the outermost heat exchange chambers 4a to form a concentration distribution corresponding to the height-direction concentration variation of the rectifying section, and the vapor is condensed due to local heat exchange. The condensed liquid returns to the innermost heat exchange section 2 from the vapor inlet 71 as a reflux liquid at a suitable concentration. Thus, distillation can be carried out with a large reduction of energy consumption. In general, in such a distillation column, the temperature at the bottom of the rectifying section is the highest. If the outermost heat exchange section 4 had not been partitioned, there would be a large temperature difference formed between the stripping section and the rectifying section at the column top. Thus, operation would become easier if the outermost heat exchange section 4 had not been partitioned. However, it is preferable for the outermost heat exchange section 4 to be partitioned into a plurality of outermost heat exchange chambers 4a, in view of the high degree of energy saving. Which of these configurations should be adopted depends on the size of the distillation column and the characteristics of the substances to be distilled, or the like.

There are no particular limitations regarding the number of outermost heat exchange chambers 4a (the number of partitions of the outermost heat exchange section 4). The greater the number of partitions, the more complex the structure of the distillation column becomes, and thus the number of partitions can be chosen in consideration of the degree of energy saving.

EXAMPLES

The invention will be described in greater detail through specific embodiments in the following examples. The invention is not limited to these embodiments only, and also includes any modifications and improvements that may be understood to those skilled in the art.

Example 1

Figure 4:
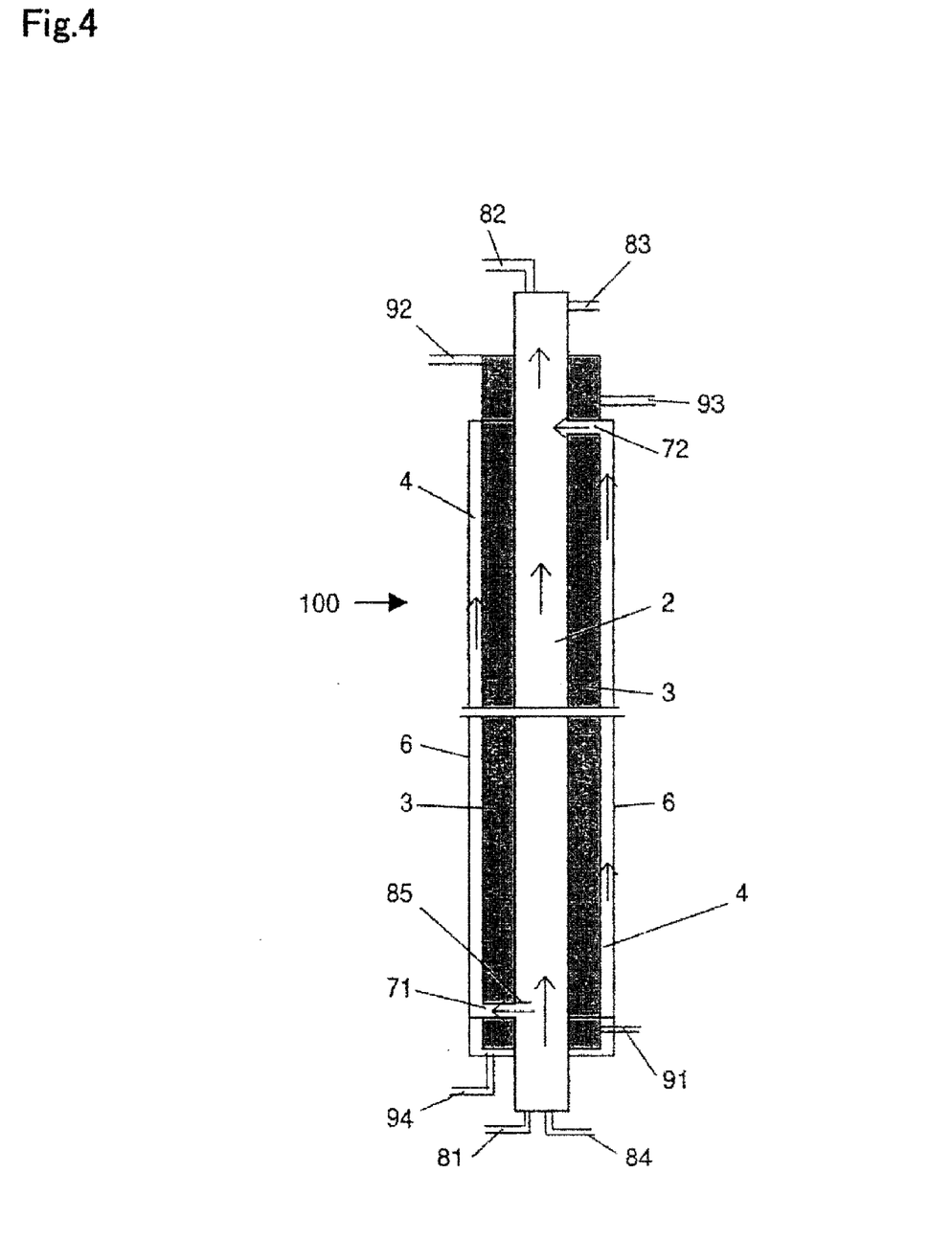
FIG. 4 is a front cross-sectional view of a triple-structured internal heat exchange-type distillation column according to an embodiment of the present invention.

The multi-structured internal heat exchange-type distillation column of the present invention will be described using the triple-structured internal heat exchange-type distillation column as an example. FIG. 4 is a front cross-sectional view of a triple-structured internal heat exchange-type distillation column 100 (hereinafter, referred to simply as "distillation column"). The distillation column 100 is constituted by the innermost heat exchange section 2, the intermediate section 3, and the outermost heat exchange section 4. The innermost heat exchange section 2 and the intermediate section 3 are isolated from one another, and the intermediate section 3 and the outermost heat exchange section 4 are also isolated from one another. The outer surface of the intermediate section 3 is in thermal contact with the outermost heat exchange section 4 and its inner surface is in thermal contact with the innermost heat exchange section 2. The outermost heat exchange section 4 is in communication with the innermost heat exchange section 2 through the lower vapor tunnel connecting port 71 and the upper vapor tunnel connecting port 72. Thus, by setting the innermost heat exchange section 2 and the outermost heat exchange section 4 as the higher-pressure side (higher temperature side) and setting the intermediate section 3 as the lower pressure side (lower temperature side), or by setting the innermost heat exchange section 2 and the outermost heat exchange section 4 as the lower-pressure side (lower temperature side) and setting the intermediate section 3 as the higher pressure side (higher temperature side), it is possible to transport heat from the higher pressure side (higher temperature side) to the lower pressure side (lower temperature side) through the inner and outer surfaces of the intermediate section 3.

Below, the multi-structured internal heat exchange-type distillation column of the present invention is described using a case in which the innermost heat exchange section 2 and the outermost heat exchange section 4 have been set as the higher-pressure side (higher temperature side; that is, the rectifying section) and the intermediate section 3 has been set as the lower pressure side (lower temperature side; that is, the stripping section). In FIG. 4, the arrow indicates the flow of vapor. A rectifying section vapor inlet 81 is provided near the bottom of the innermost heat exchange section 2 of the distillation column 100. A rectifying section vapor outlet 82 is provided at the top of the innermost heat exchange section 2. A rectifying section liquid inlet 83 is provided near the column top of the innermost heat exchange section 2, and a rectifying section liquid outlet 84 is provided at the bottom of the innermost heat exchange section 2. A stripping section vapor inlet 91 is provided near the bottom of the intermediate section 3, and a stripping section vapor outlet 92 is provided at the top of the intermediate section 3. A stripping section liquid inlet 93 is provided slightly below the stripping section vapor outlet 92 in the upper part of the intermediate section 3, and a stripping section liquid outlet 94 is provided at the bottom of the intermediate section 3.

The vapor supplied from the rectifying section vapor inlet 81 flows upward within the innermost heat exchange section 2, and when the vapor gives its latent heat to the intermediate section 3, the condensate liquid trickles down along the inner wall of the innermost heat exchange section 2, and distillation is performed while gas-liquid contact occurs between the liquid flowing downward and the vapor rising from the lower part of the innermost heat exchange section 2. The vapor is recovered from the rectifying section vapor outlet 82, whereas the liquid is collected at the bottom of the innermost heat exchange section 2.

On the other hand, some of the vapor of the rectifying section enters the outermost heat exchange section 4 from the lower vapor tunnel connecting port 71, flows upward and returns to the innermost heat exchange section 2 through the vapor tunnel outlet 72. When the vapor flowing through the outermost heat exchange section 4 also gives its latent heat to the intermediate section 3, the vapor is condensed. The condensate liquid trickles down along the inner wall of the outermost heat exchange section 4 having gas-liquid contact with the flowing-up vapor and returns to the innermost heat exchange section 2 through the lower vapor tunnel connecting port 71. The liquid collected at the bottom of the innermost heat exchange section 2 is discharged from the rectifying section liquid outlet 84.

In the intermediate section 3, vapor is supplied from the stripping section vapor inlet 91 arranged near the bottom of the intermediate section 3, and the flowing-up vapor is distilled having gas-liquid contact with the flowing-down liquid supplied from the stripping section liquid inlet 93. The vapor arriving at the top is discharged through the stripping section vapor outlet 92. The liquid collected at the bottom of the intermediate section 3 is discharged from the stripping section liquid outlet 94.

During this process, heat is transferred from both the innermost heat exchange section 2 and the outermost heat exchange section 4 to the intermediate section 3 and therefore the efficiency of heat exchange is extremely high and distillation is performed efficiently.

Figure 2:
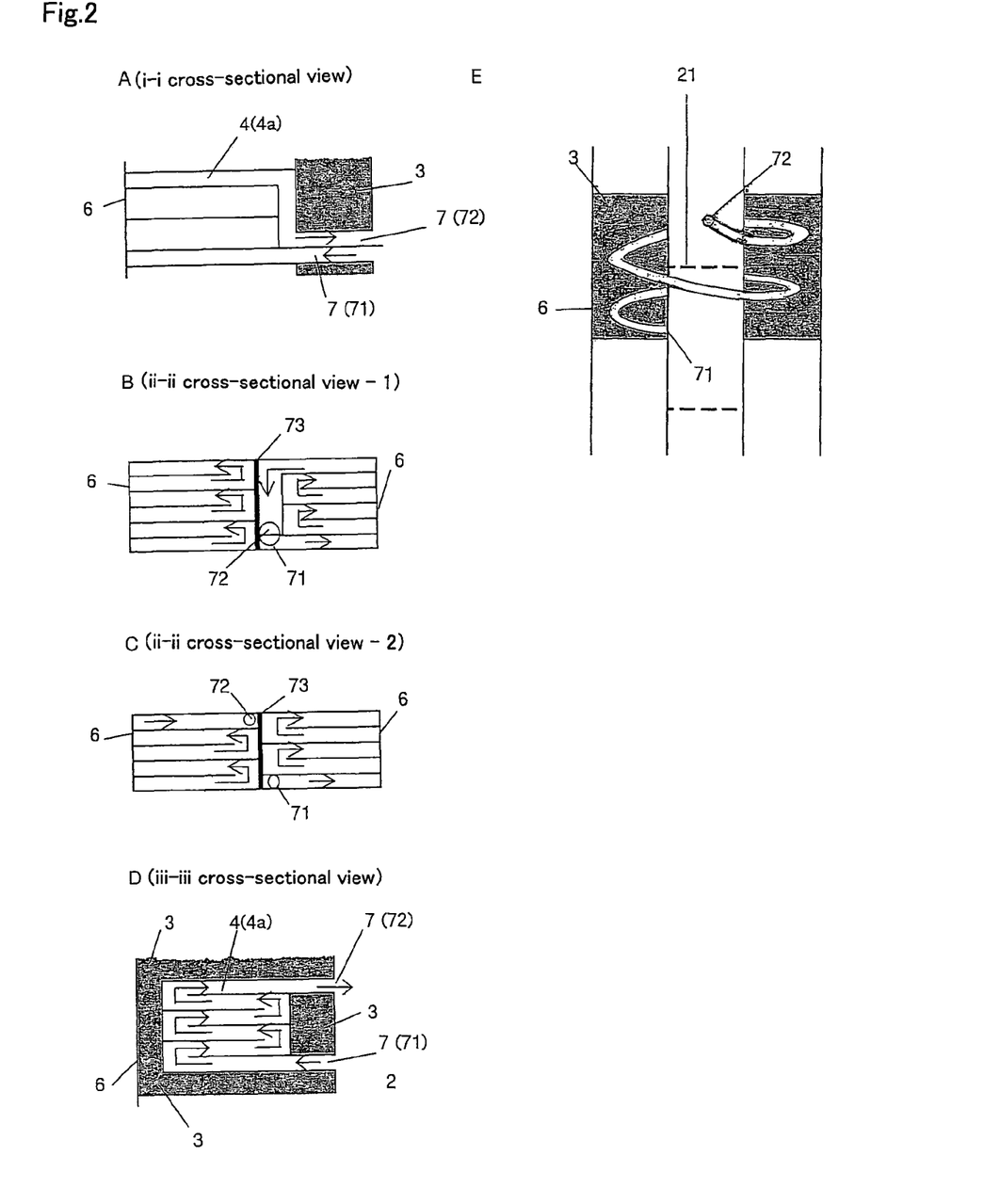
FIG. 2 is a partial cross-sectional view showing an example of the shape of the channel inside the outermost heat exchange section.
Figure 3:
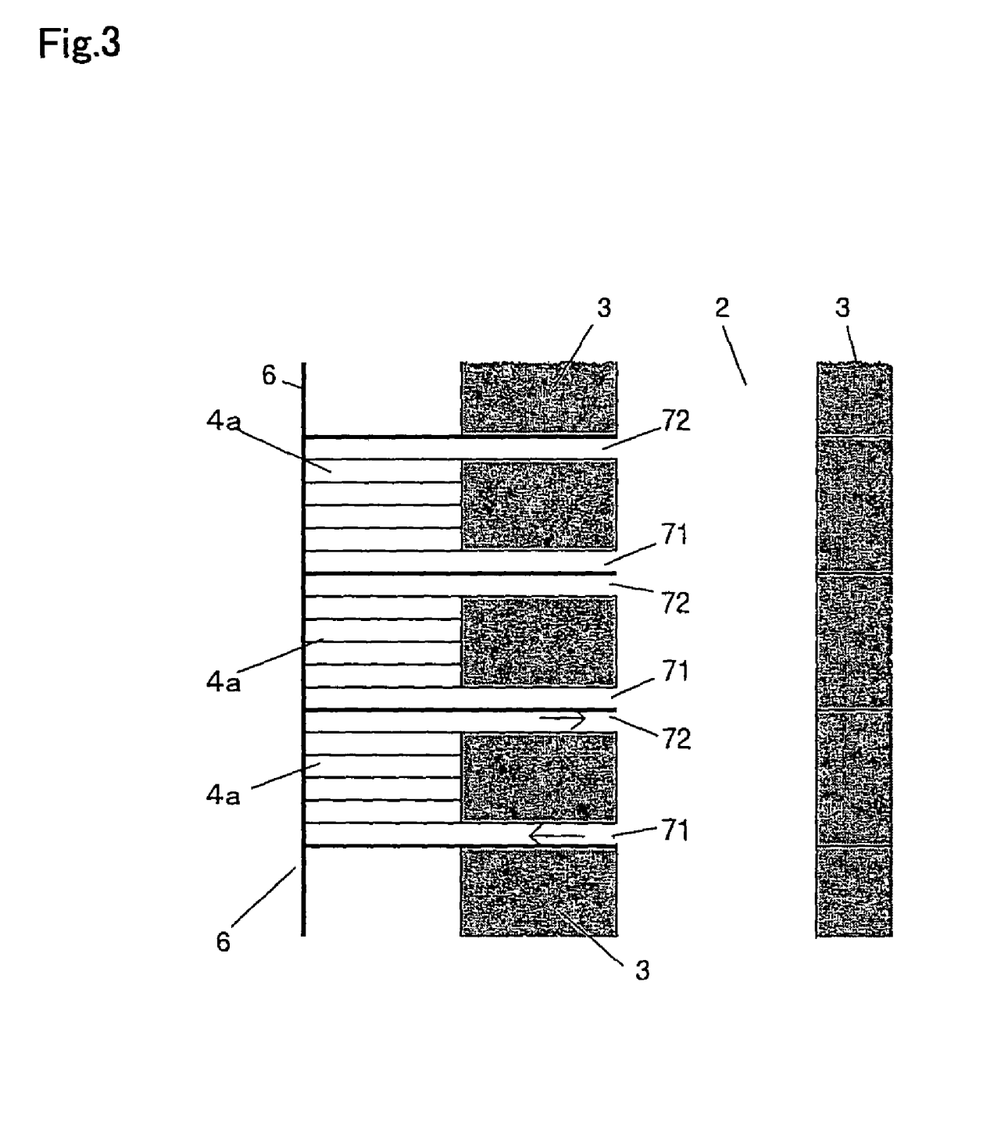
FIG. 3 is a schematic cross-sectional view showing the structure of the outermost heat exchange chambers.

In order that the vapor entering the outermost heat exchange section 4 from the vapor inlet 71 flows in one direction with effective heat transfer and goes out from the vapor outlet 72, it is also possible to form a channel inside the innermost heat exchange section 2 by providing a baffle plate such as that shown in FIG. 2. Alternatively, a pipe with a semi-circular cross-section and a spiral pipe with a semi-circular cross-section spirally can also serve as the vapor channel.

To further increase the separation efficiency of the distillation and the energy saving effect, it is preferable for the innermost heat exchange section 2 and/or the intermediate section 3 of the distillation column to be provided with packings or with trays. It is preferable for both the innermost heat exchange section 2 and the intermediate section 3 to be provided with packings or with trays. There are no particular limitations regarding the arrangement of the packings or the trays. For example, it is preferable to provide the innermost heat exchange section 2 with trays and to fill the intermediate section 3 with packings, and vice versa.

Examples of the packings include the ones normally used by those skilled in the art, that is, structured packings or random packings.

Examples of the trays include the ones normally used by those skilled in the art. The trays can be entirely perforated, only partially perforated (for example, only the sieve section), or entirely non-perforation. The trays can have no weir or an overflow weir. Alternatively, these can be used in combination. Examples of such trays include lift trays, valve trays, sieve trays, and cap trays.

When packings or trays are not provided, the rectifying section vapor of the innermost heat exchange section 2 should have little pressure drop. Thus, the rectifying section vapor of the innermost heat exchange section 2 does not readily enter the outermost heat exchange section 4 through the vapor tunnel connecting tube. Thus, it is for example preferable to provide a channel-guiding eaves 85 near the vapor inlet 71 as shown in FIG. 4, and to forcibly introduce vapor into the outermost heat exchange section 4.

Example 2

Figure 5:
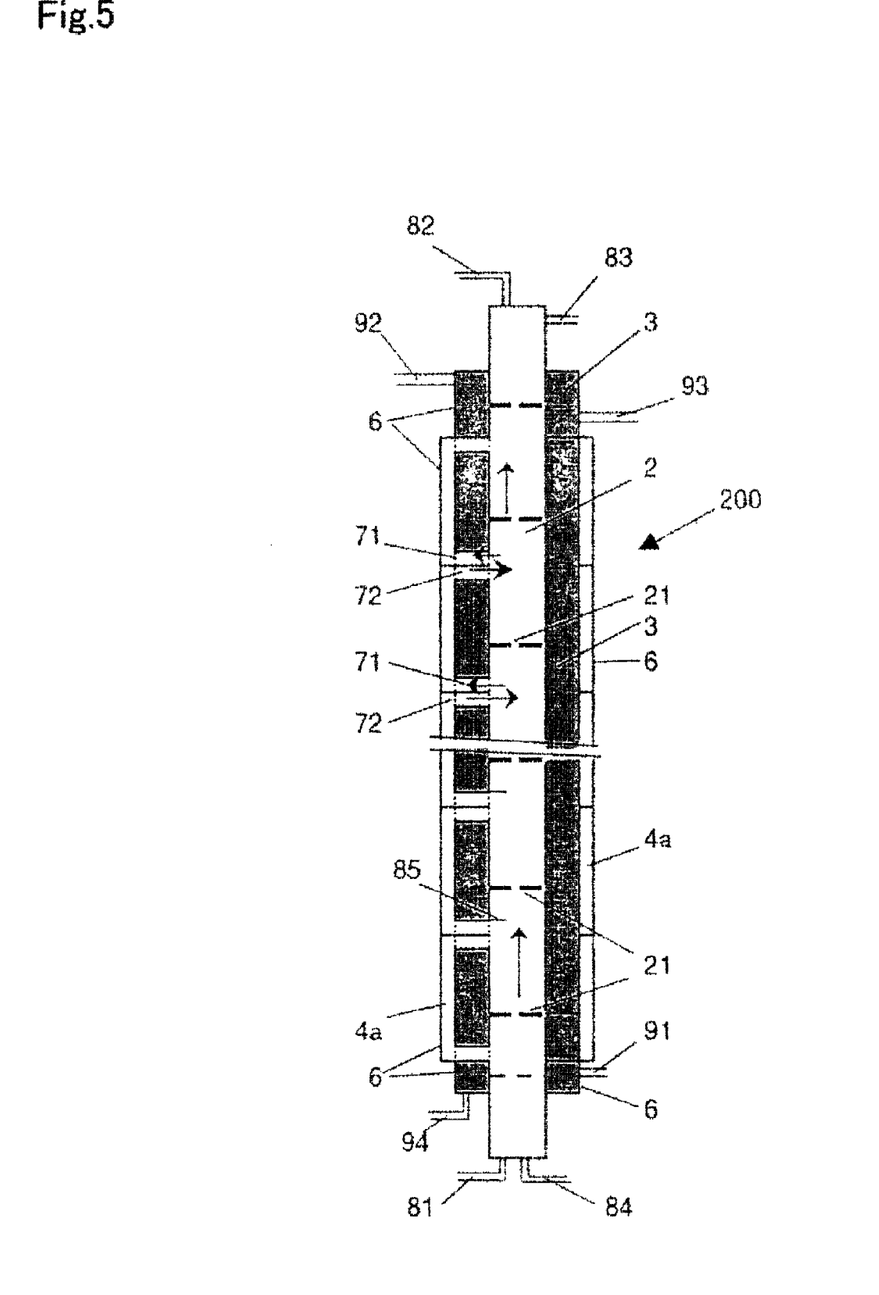
FIG. 5 is a front cross-sectional view of a triple-structured internal heat exchange-type distillation column according to another embodiment of the present invention.

A triple-structured internal heat exchange-type distillation column as another embodiment of the present invention will be described with reference to FIG. 5. FIG. 5 is a front cross-sectional view of a triple-structured internal heat exchange-type distillation column (hereinafter, referred to simply as "distillation column") 200. In the distillation column 200, the innermost heat exchange section 2 and the outermost heat exchange section 4 both serve as the rectifying section and the intermediate section 3 serves as the stripping section. In addition, the innermost heat exchange section 2 of the distillation column of FIG. 5 is equipped with trays 21. The reference numbers in FIG. 5 that are identical to those in FIG. 4 denote structures with the same functions as in FIG. 4.

As shown in FIG. 5, the outermost heat exchange section 4 of the distillation column 200 is made up of a plurality of outermost heat exchange chambers 4a that are installed independent of one another and arranged vertically. Each of the outermost heat exchange chambers 4a is in connection with the innermost heat exchange section 2 via two vapor tunnel connecting ports 71 and 72. This connection allows the outermost heat exchange chambers 4a to function as the rectifying section.

In FIG. 5, the vapor introduced into the innermost heat exchange section 2 from the rectifying section vapor inlet 81 located near the bottom of the innermost heat exchange section 2 flows up along the inner wall of the innermost heat exchange section 2, during which time the vapor is condensed giving its latent heat to the intermediate section 3. The condensate liquid flows down along the inner wall of the innermost heat exchange section 2, having gas-liquid contact with the flowing-up vapor and the distillation process proceeds at the same time.

On the other hand, vapor enters each of the outermost heat exchange chambers 4a from the corresponding vapor inlet 71 arranged at the lowest position of each outermost heat exchange chambers 4a. The configuration is such that the vapor flows in one-way traffic in the channel formed inside the outermost heat exchange chambers 4a and returns to the innermost heat exchange section 2 from the vapor outlet 72 arranged at the highest position of each outermost heat exchange chamber 4a. During this traffic time, the vapor is condensed giving its latent heat to the intermediate section 3. This condensate liquid flows down in the opposite direction of the vapor flow along the channel and arrives at the vapor inlet 71. Owing to gas-liquid contact, the distillation process progresses at this time even inside the channel.

The vapor that has returned to the innermost heat exchange section 2 from the outermost heat exchange chambers 4a is ultimately recovered from the rectifying section vapor outlet 82 located at the top of the innermost heat exchange section 2. On the other hand, the liquid discharged into the innermost heat exchange section 2 from the vapor tunnel connecting ports (vapor inlets) 71 is collected at the bottom, and then recovered from the rectifying section liquid outlet 84.

Thus, by partitioning the outermost heat exchange section 4 into a plurality of outermost heat exchange chambers 4a and making it function as the rectifying section, the vapor introduced into the outermost heat exchange chambers 4a forms a concentration variation corresponding to the height direction concentration variation of the rectifying section. The liquid condensed in each of the partitions is returned to the rectifying section at the position of that partition as reflux liquid, and thus the distillation process is promoted. On the other hand, if the reflux effect is insufficient, then distillation and subsequent concentration are not possible, so that, in conventional devices, it is necessary for the vapor to be condensed by the overhead condenser where the latent heat for condensation is withdrawn to the outside. This conventional method brings about a great waste of energy. As different from that, the distillation column of the present invention can reduce the amount of external reflux. In other words, the energy consumption for distillation can be saved by such an internal heat exchange. The distillation column of the present invention is an energy-saving distillation column that can approach the ideal operation, in which the distillation column can be operated by only the internal heat exchange between the rectifying and stripping sections.

In the distillation column of Example 2, trays 21 are installed in the innermost heat exchange section 2 and/or the intermediate section 3. It is also possible to insert appropriate packings instead of the trays 21. Owing to the pressure drop by each tray 21 (or packings), the pressure difference between the vapor inlet 71 and the vapor outlet 72 can make the vapor flow smoothly within the outermost heat exchange section 4

(outermost heat exchange chambers 4*a*). This effect leads to an improved distillation efficiency. Alternatively, it is also possible to provide a channel-guiding eaves 85 near (slightly above) the vapor inlet 71 in the innermost heat exchange section 2. If trays are used within the innermost heat exchange section 2, they can be placed between the vapor inlet 71 and the vapor outlet 72. In the case of packings, they can be placed at the position of the vapor inlet 71 or the vapor outlet 72. If the trays or packings are placed at this location in such manner, the pressure becomes higher near the vapor inlet 71 of the outermost heat exchange chamber 4*a* than near the vapor outlet 72 due to the pressure loss, so that the vapor can be supplied more smoothly into the outermost heat exchange chamber 4*a*. In addition, a single one-way traffic channel should be routed for vapor flow inside the outermost heat exchange chamber 4*a* so that the vapor may not form a stagnant zone in the outermost heat exchange section 4 (outermost heat exchange chambers 4*a*). Further, in order to raise the efficiency of heat transfer, it is possible to provide the channel inside the outermost heat exchange chambers 4*a* by inserting a plate such as that of FIG. 2, or a guide can be equipped using a baffle plate or the like, so that the vapor can flow upward spirally through the outermost heat exchange chamber 4*a*.

Example 3

Figure 6:
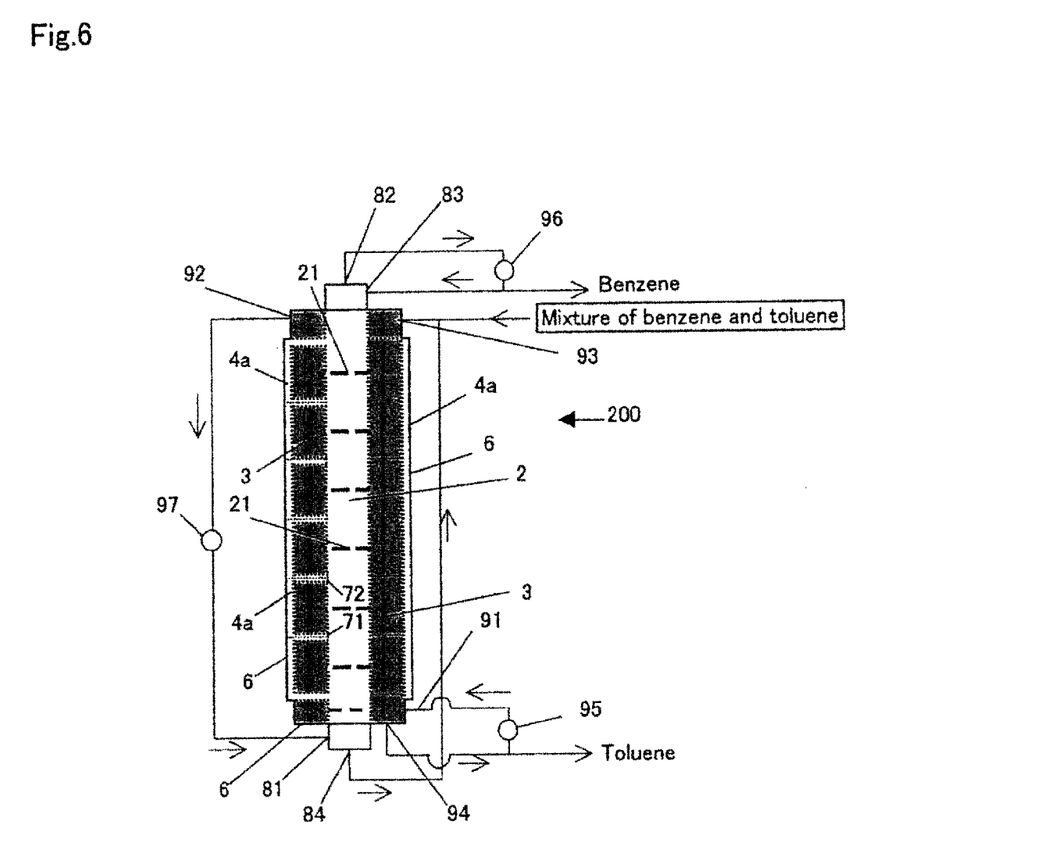
FIG. 6 is a diagram that shows an example of the operation conditions for separating toluene from a binary mixture of benzene and toluene using the triple-structured internal heat exchange-type distillation column of the present invention.

Using the triple-structured internal heat exchange-type distillation column 200 of Example 2 of the present invention, the operation conditions for the rectification of a binary mixture of benzene and toluene will be described with reference to FIG. 6. The distillation column 200 shown in FIG. 6 comprises an innermost heat exchange section 2 and outermost heat exchange chambers 4*a* for the rectifying section and an intermediate section 3 serving as the stripping section. The innermost heat exchange section 2 is equipped with trays 21. In each outermost heat exchange chamber 4*a*, a single one-way traffic channel is formed spirally inside from the vapor inlet 71 to the vapor outlet 72 due to a baffle plate.

First, the feed solution of benzene/toluene mixture is supplied from the top of the stripping section, i.e. liquid inlet 93 into the intermediate section 3. The intermediate section 3 (stripping section) is set at a temperature distribution roughly estimated with the specified pressure, so that the upper part of the intermediate section 3 (stripping section) is for example near the boiling point of benzene at this operation pressure while the lower part is set near the boiling point of toluene at this pressure. Thus, during the distillation operation, pure toluene collected as the internal reflux at the bottom of the intermediate section 3 (stripping section) is recovered as the bottom product from a stripping section liquid outlet 94 and some of the toluene is evaporated by a reboiler 95 and fed back into the intermediate section 3 (stripping section) through the stripping section vapor inlet 91. The fed-back vapor becomes the heat source for the intermediate section 3 (stripping section). On the other hand, vapor mixture that contains benzene as the more-volatile component is discharged from the top of the stripping section, i.e. vapor outlet 92, pressurized by a compressor 97, and compressed into the innermost heat exchange section 2 (rectifying section) from the bottom of the rectifying section, i.e. vapor inlet 81. The compressed vapor mixture becomes the heat source of the innermost heat exchange section 2 and the outermost heat exchange chambers 4*a* (rectifying section). Due to the vapor compression the innermost heat exchange section 2 and the outermost heat exchange chambers 4*a* (rectifying section) is set to a higher temperature owing to a raised pressure than the intermediate section 3 (stripping section), so that the upper part of the innermost heat exchange section 2 and the outermost heat exchange chambers 4*a* (rectifying section) is for example near the boiling point of benzene at that pressure and the lower part thereof is for example near the boiling part of toluene at this pressure. Thus, pure benzene vapor discharged from the top of the rectifying section, i.e. vapor outlet 82 is condensed by an overhead condenser 96, and some of the benzene condensate is recovered as the overhead product. The remaining benzene (condensate) is refluxed back into the top of the innermost heat exchange section 2 (rectifying section) from the rectifying section liquid inlet 83. The mixture of benzene and toluene collected at the bottom of the innermost heat exchange section 2 (rectifying section) is discharged from the rectifying section liquid outlet 84 and introduced into the intermediate section 3 (stripping section) from the stripping section liquid inlet 93 along with the feed benzene/toluene mixture. In this way, the benzene/toluene mixture is rectified in a continuous manner.

If the feed mixture is different from the benzene/toluene system, it is possible to reduce the pressure of the stripping section so as to lower the temperature below that of the rectifying section, thereby attaining an effective temperature difference for internal heat exchange.

INDUSTRIAL APPLICABILITY

The multi-cylinder-structured internal heat exchange type distillation column of the present invention can carry out the internal heat exchange very efficiently because the inner and outer surfaces of the intermediate section are in thermal contact with the innermost and outermost heat exchange sections, respectively. As a result, multi-structured internal heat exchange-type distillation column by the present invention can be usefully employed for various distillation processes by virtue of excellent efficiency of internal heat exchange, great reduction of energy consumption and excellent efficiency of fractional distillation.

The invention claimed is:

1. A multi-structured internal heat exchange-type distillation column comprising at least an outermost heat exchange section, an intermediate section, and an innermost heat exchange section;

wherein the innermost heat exchange section is isolated from the intermediate section;

wherein the outermost heat exchange section is also isolated from the intermediate section;

wherein the outermost heat exchange section and the innermost heat exchange section are in communication with one another through at least two vapor tunnel connecting ports;

a channel formed inside the outermost heat exchange section in such a manner that, in a case where at least one of the vapor tunnel connecting ports serves as an inlet for vapor from the innermost heat exchange section into the outermost heat exchange section, and the other vapor tunnel connecting port serves as an outlet for vapor from the outermost heat exchange section back to the innermost heat exchange section, the vapor can smoothly flow in one-way traffic from the inlet toward the outlet;

wherein either the outermost heat exchange section and the innermost heat exchange section, or the intermediate section, is a rectifying section, and the other is a stripping section;

wherein the outermost heat exchange section is made up of a plurality of outermost heat exchange chambers that are arranged independent of one another and horizontal direction;

wherein each of the plurality of outermost heat exchange chambers is in communication with the innermost heat exchange section through the at least two vapor tunnel connecting ports; and wherein the channel is formed inside each of the plurality of outermost heat exchange chambers.

2. A multi-structured internal heat exchange-type distillation column comprising at least an outermost heat exchange section, an intermediate section, and an innermost heat exchange section;

wherein the innermost heat exchange section is isolated from the intermediate section;

wherein the outermost heat exchange section is also isolated from the intermediate section;

wherein the outermost heat exchange section and the innermost heat exchange section are in communication with one another through at least two vapor tunnel connecting ports;

a channel formed inside the outermost heat exchange section in such a manner that, in a case where at least one of the vapor tunnel connecting ports serves as an inlet for vapor from the innermost heat exchange section into the outermost heat exchange section, and the other vapor tunnel connecting port serves as an outlet for vapor from the outermost heat exchange section back to the innermost heat exchange section, the vapor can smoothly flow in one-way traffic from the inlet toward the outlet;

wherein the outermost heat exchange section and the innermost heat exchange section are the rectifying section, and the intermediate section is the stripping section.

\* \* \* \* \*

UNITED STATES PATENT AND TRADEMARK OFFICE
CERTIFICATE OF CORRECTION

| | |
|---|---|
| PATENT NO. | : 7,846,303 B2 |
| APPLICATION NO. | : 11/660444 |
| DATED | : December 7, 2010 |
| INVENTOR(S) | : Noda et al. |

It is certified that error appears in the above-identified patent and that said Letters Patent is hereby corrected as shown below:

Column 1, lines 11-12, "Cell surface layer binding protein and utilization thereof," should read --Multi-Structure Internal Heat Exchange Type Distillation Tower,--.

Signed and Sealed this
Twelfth Day of April, 2011

David J. Kappos
*Director of the United States Patent and Trademark Office*